United States Patent [19]

Ewald et al.

[11] Patent Number: 6,119,587

[45] Date of Patent: *Sep. 19, 2000

[54] COOKED FOOD STAGING DEVICE AND METHOD

[75] Inventors: Henry T. Ewald, Schaumburg; Jimmie L. Coffey, St. Charles; Patricia A. Venetucci, Hawthorn Woods; Gerald A. Sus, Frankfort, all of Ill.

[73] Assignee: Restaurant Technology, Inc., Oak Brook, Ill.

[ * ] Notice: This patent is subject to a terminal disclaimer.

[21] Appl. No.: 08/620,960

[22] Filed: Mar. 22, 1996

Related U.S. Application Data

[63] Continuation-in-part of application No. 08/439,160, May 11, 1995, abandoned.

[51] Int. Cl.⁷ ..................................................... A47J 37/00
[52] U.S. Cl. ................................ 99/374; 99/389; 99/448; 99/468; 99/483; 426/418
[58] Field of Search ............................ 99/483, 373, 374, 99/389, 448, 468, 416; 426/418; 312/326; 219/400, 386, 214

[56] References Cited

U.S. PATENT DOCUMENTS

| | | | |
|---|---|---|---|
| 1,292,658 | 1/1919 | Smith | 99/374 |
| 1,638,041 | 8/1927 | Korkames | 99/483 |
| 1,814,942 | 7/1931 | Mabey | 99/374 |
| 2,076,091 | 4/1937 | O'Neill . | |
| 2,108,778 | 2/1938 | Morgan | 99/374 |
| 2,283,182 | 5/1942 | Carl | 99/389 |
| 2,860,225 | 11/1958 | Steen | 99/389 |
| 3,246,690 | 4/1966 | Fry . | |
| 3,313,917 | 4/1967 | Ditzler et al. | 219/400 |
| 3,908,749 | 9/1975 | Williams . | |
| 3,924,100 | 12/1975 | Mack et al. . | |
| 4,020,310 | 4/1977 | Souder, Jr. et al. . | |
| 4,068,115 | 1/1978 | Mack et al. . | |
| 4,093,041 | 6/1978 | Davis et al. . | |
| 4,110,587 | 8/1978 | Souder, Jr. et al. . | |
| 4,180,125 | 12/1979 | Schulz et al. . | |
| 4,210,675 | 7/1980 | Liebermann . | |
| 4,224,862 | 9/1980 | Liebermann . | |
| 4,232,789 | 11/1980 | Springer . | |
| 4,254,824 | 3/1981 | Springer . | |
| 4,278,697 | 7/1981 | Lieberman . | |
| 4,346,756 | 8/1982 | Dodd et al. . | |

(List continued on next page.)

FOREIGN PATENT DOCUMENTS

| | | |
|---|---|---|
| 829729 | 3/1960 | France . |
| 876812 | 9/1961 | France . |
| 1371538 | 10/1963 | France . |

OTHER PUBLICATIONS

Wells Models DABC–1PS and DABC–1TL Equipment Manual, Apr., 1989, pp. 1–7.

Henny Penny Model HC–934DA Equipment Manual, Apr., 1995, pp. 1–6.

Carter–Hoffmann Models MD–110TL and MD–110PS Equipment Manual, Aug. 1994, pp. 1–8.

*Primary Examiner*—Patrick F. Brinson
*Assistant Examiner*—James F. Hook
*Attorney, Agent, or Firm*—Ryndak & Lyerla

[57] ABSTRACT

A cooked food staging device and method is provided. The cooked food staging device allows previously cooked food items, particularly sandwich fillings such as hamburger patties, fish fillets, biscuits, Canadian bacon, pork sausage, eggs, chicken patties, chicken fillets and nuggets, to be stored over extended periods of time at an elevated temperature without significant deleterious effects to the appearance, taste and texture of the food while avoiding risk of bacterial contamination. The food staging device is composed of a plurality of discrete compartments bounded by upper and lower heated compartment surfaces. Food can be stored within the compartments in trays having side walls of a height such that a gap is achieved between the top of the tray and the upper compartment heated surface to limit and control the evaporation of liquid from the food stored therein.

15 Claims, 10 Drawing Sheets

U.S. PATENT DOCUMENTS

| | | | |
|---|---|---|---|
| 4,446,780 | 5/1984 | Puvogel et al. | 99/483 |
| 4,650,179 | 3/1987 | Bond . | |
| 4,784,054 | 11/1988 | Karos et al. . | |
| 5,086,693 | 2/1992 | Tippmann et al. . | |
| 5,172,328 | 12/1992 | Cahlander et al. . | |
| 5,201,364 | 4/1993 | Tippmann et al. . | |
| 5,203,258 | 4/1993 | Tippmann et al. . | |
| 5,404,935 | 4/1995 | Liebermann . | |
| 5,454,427 | 10/1995 | Westbrooks et al. | 219/386 |
| 5,496,987 | 3/1996 | Siccardi et al. | 219/386 |
| 5,586,488 | 12/1996 | Liu | 219/400 |

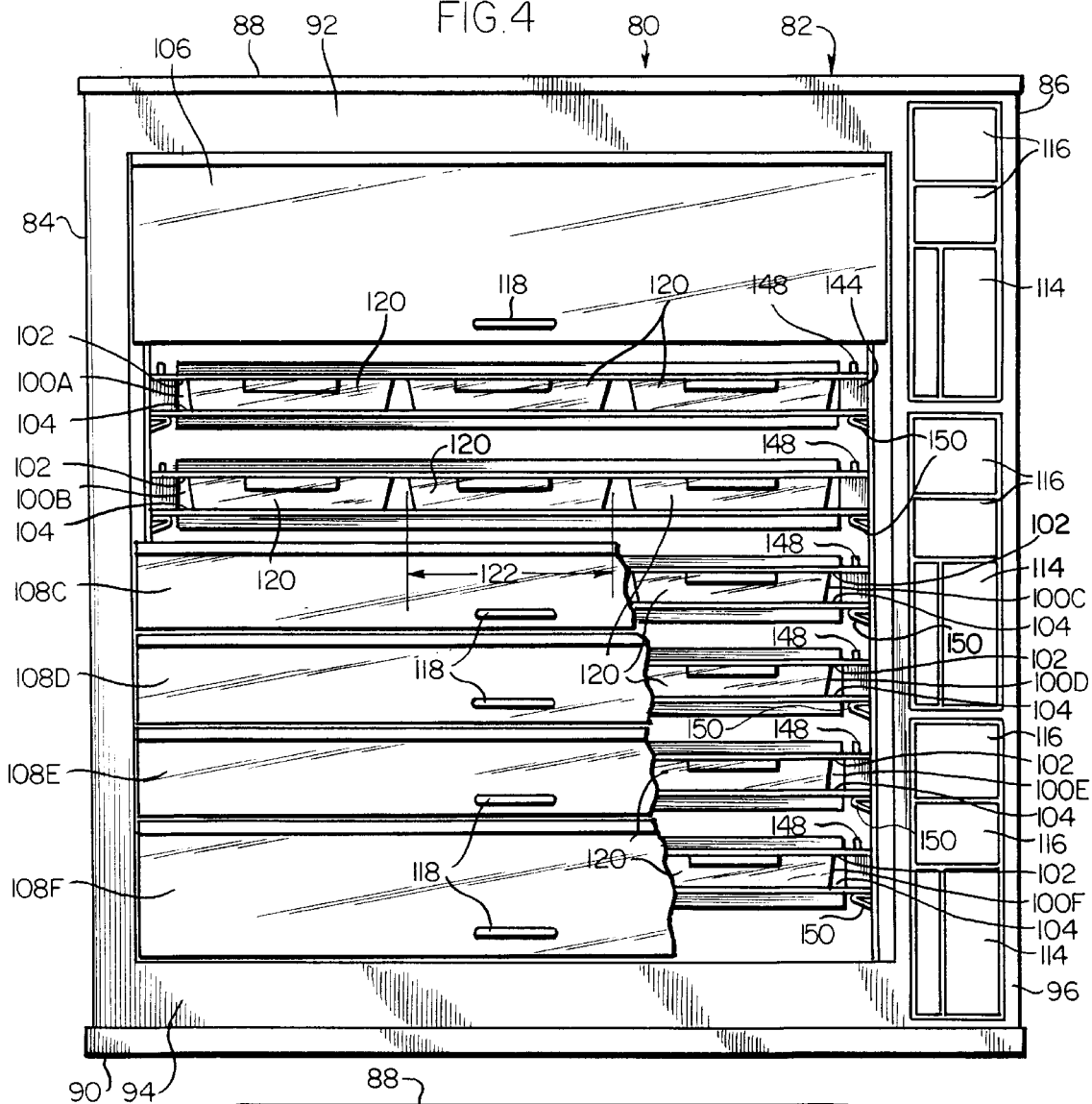
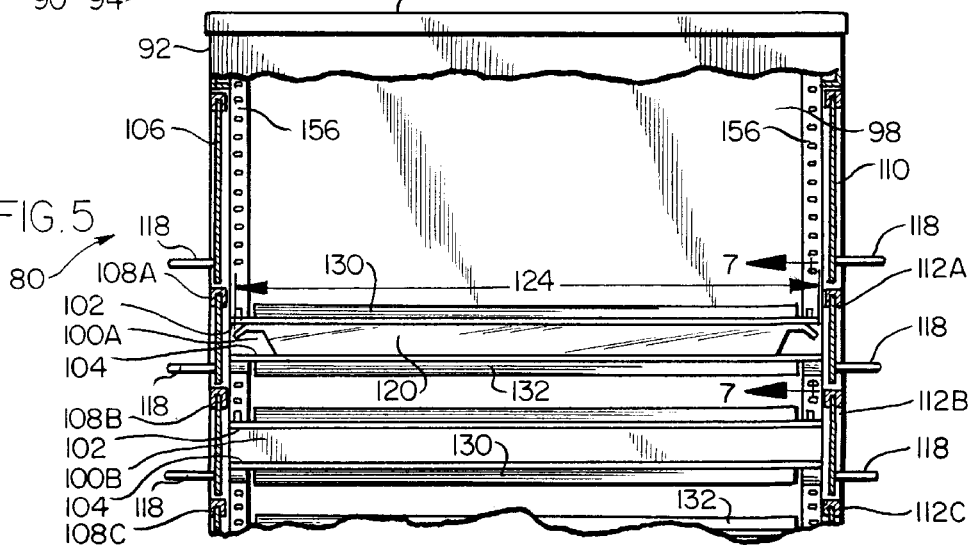

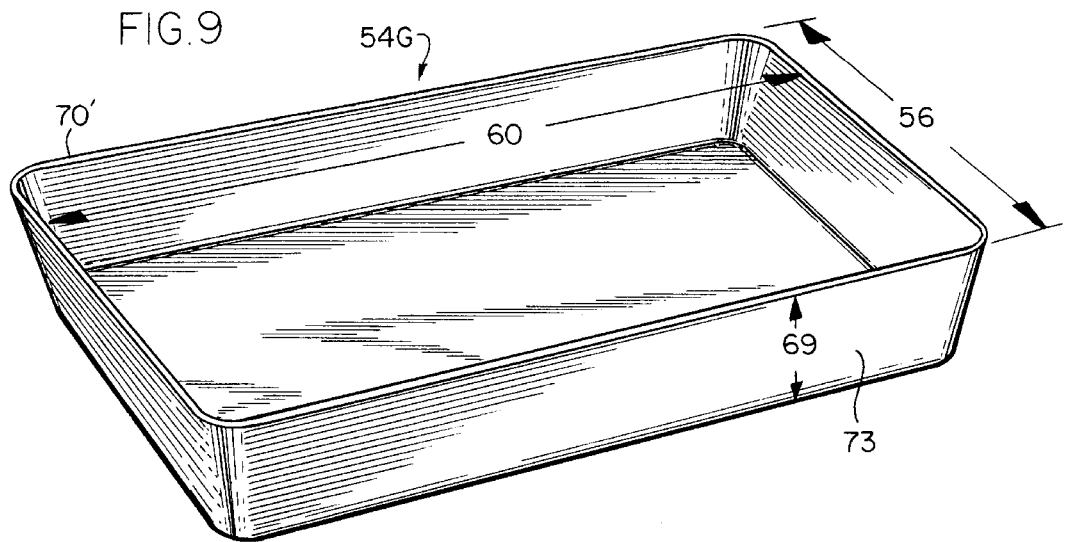
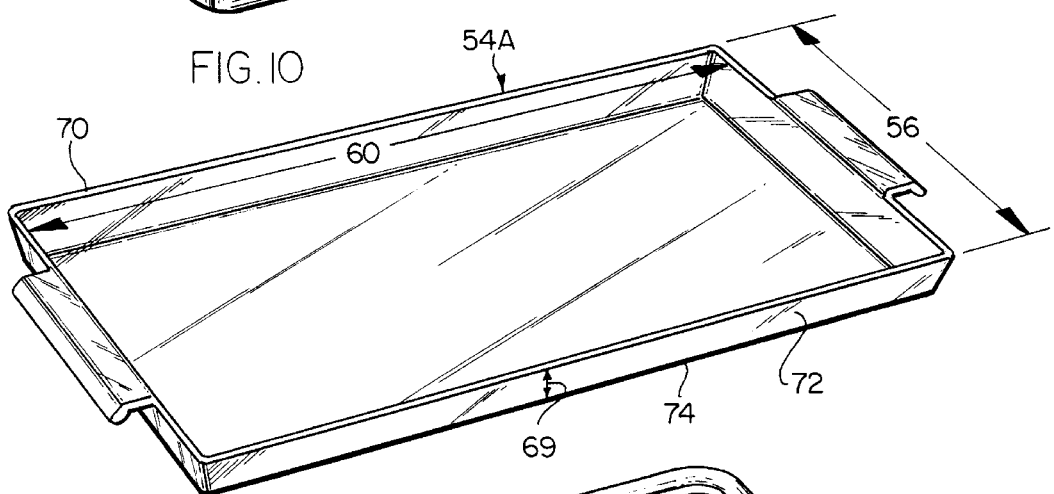
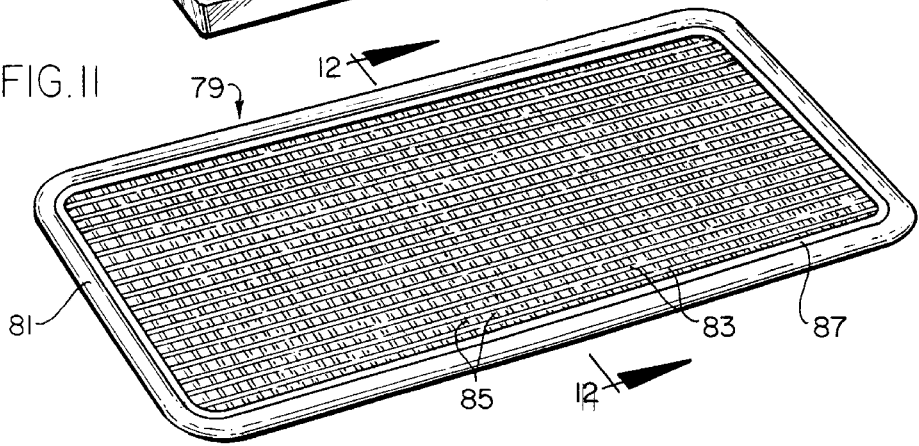
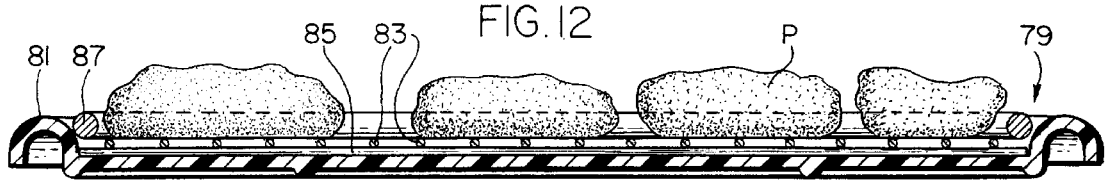

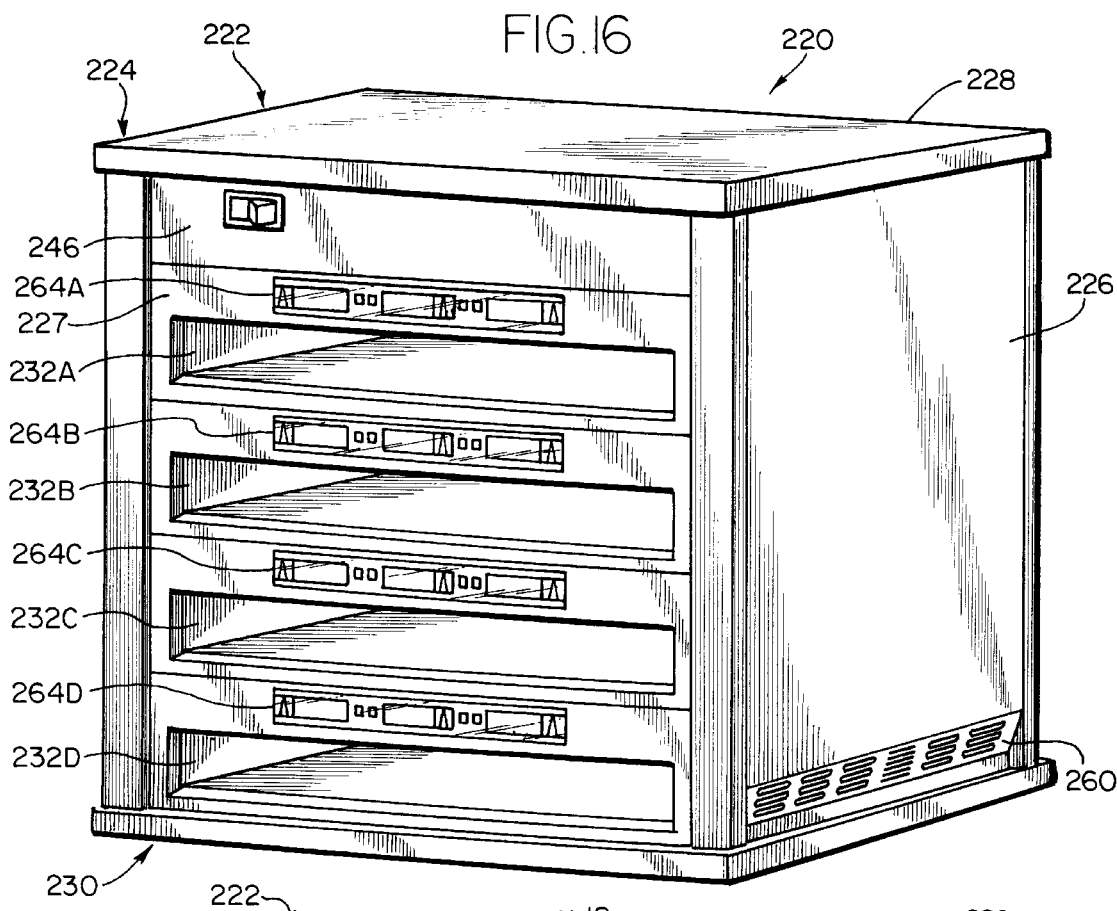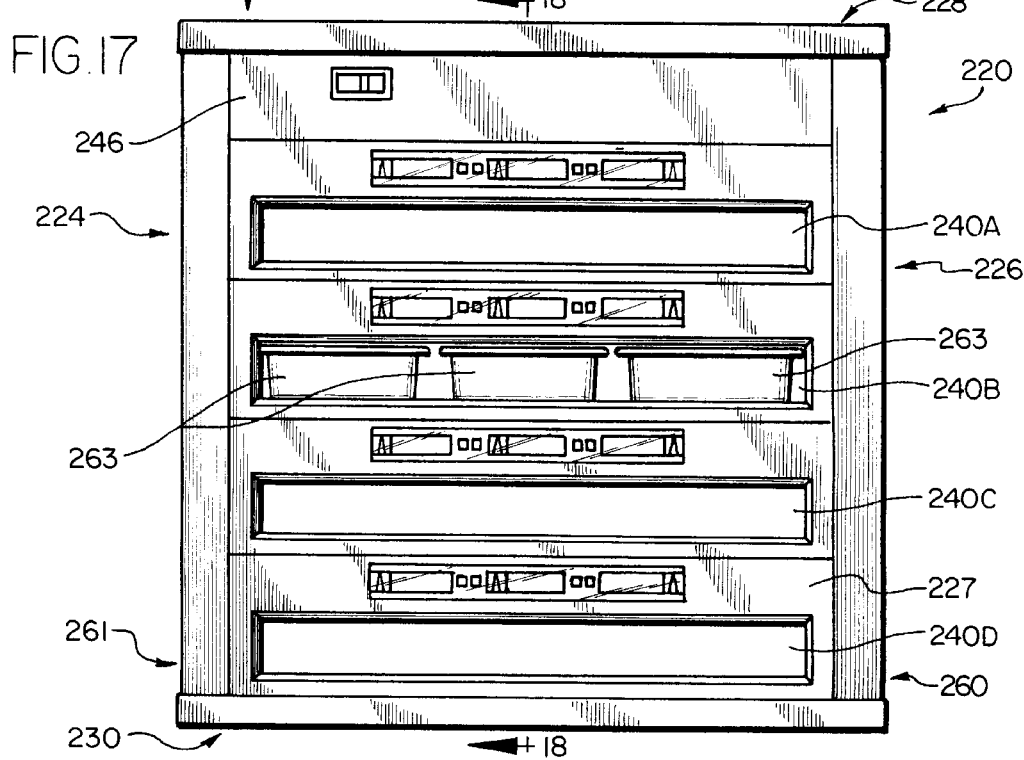

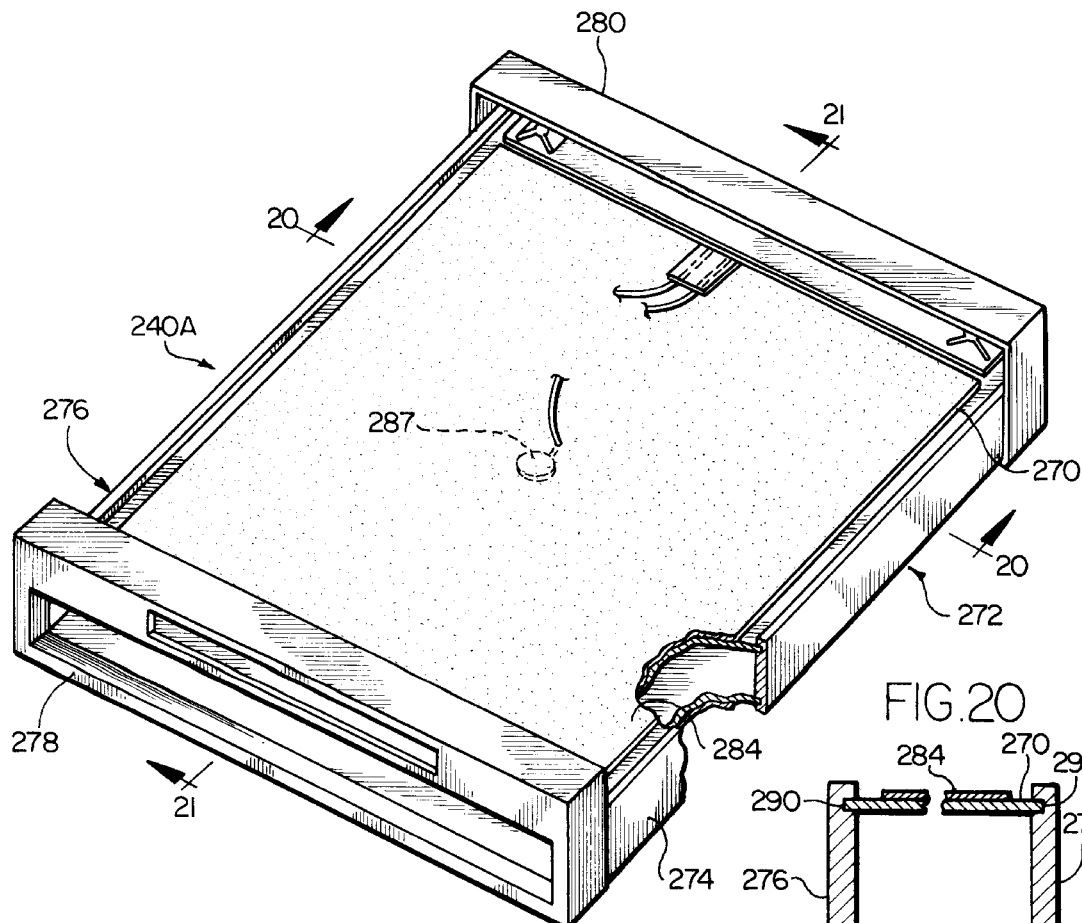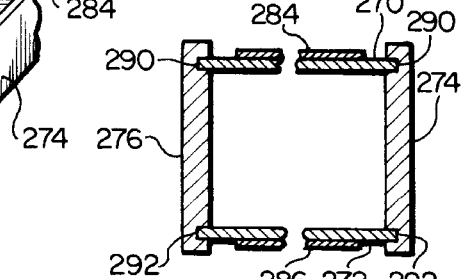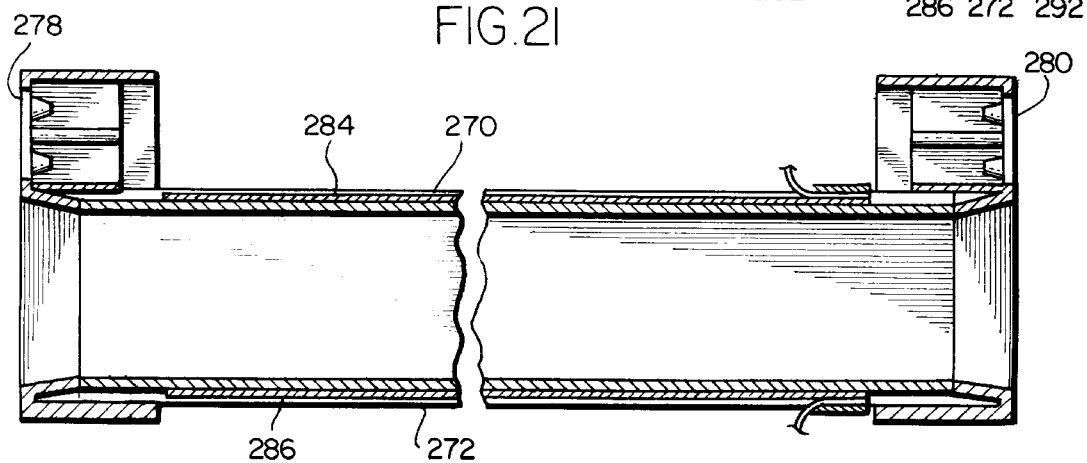

COOKED FOOD STAGING DEVICE AND METHOD

RELATED APPLICATION

This is a continuation-in-part of U.S. patent application Ser. No. 08/439,160, filed May 11, 1995, now abandoned.

FIELD OF THE INVENTION

This invention relates to a device and method for storing cooked food portions at elevated temperatures and more particularly to a staging device for holding previously cooked food portions at elevated temperatures.

BACKGROUND OF THE INVENTION

Quick service restaurants face a number of conflicting factors when striving to provide fast, palatable and safe food. First, the customers expect to receive their food quickly, with a minimum of delay and with predictable and constant high quality. Moreover, the rate of customer demand varies over time, with some periods, such as lunch and dinner times, having extremely high rates of customer demand. However, the kitchens of many quick service restaurants are of limited size and/or production capacity and thus necessarily have a limited number of food cooking devices.

Typical food products that are of most interest include sandwiches that are composed of a bun or other bakery cooked bread product and a sandwich filling that is cooked at the quick service restaurant. Typical sandwich fillings include hamburger patties, breaded fish fillets, Canadian bacon, pork sausage, eggs and breaded chicken patties, for example, as well as other products, such as chicken nuggets, biscuits, muffins and hotcakes. Consequently, the cooked food supply capacity of the restaurant is limited by the size and number of food cooking devices located at the restaurant.

To meet the competing factors of quick service and consistent high quality, it is advantageous for quick service restaurants to frequently cook a number of individual food sandwich filling portions which are then almost immediately incorporated into individual sandwiches and then wrapped and held ready in advance of actual customer orders in an open storage bin for a relatively short predetermined period of time. To insure constant high quality, if the items are not sold prior to the expiration of that time, the sandwiches are destroyed. Holding the previously cooked, prepared and wrapped sandwiches incorporating the previously cooked sandwich fillings is thus of limited utility.

Since some quick service restaurants sell very large quantities of food, even a small increase in the efficiency of handling cooked sandwich fillings and other food would be desirable.

A need exists for a device and method that acts as a buffer between the relatively fixed and limited capacity of the sandwich filling cooking step and the highly variable completed sandwich demand without any significant adverse impact on sandwich quality or food safety. In addition, a need also exists for a food staging device which promotes efficient food handling and use of space within the kitchen of the quick service restaurant.

SUMMARY OF THE INVENTION

In accordance with the present invention, an improved food staging device and method for holding previously cooked food items at elevated temperatures is provided.

The device is particularly adapted for storing over extended periods of time cooked sandwich fillings such as hamburger patties, fish fillets, Canadian bacon, pork sausage, eggs, chicken patties, chicken fillets, as well as other types of food, including biscuits, muffins and hotcakes. When used in combination with trays specifically configured for use in the staging device, the appearance, taste, and texture of the previously cooked food items is maintained over extended storage periods (such as about up to two hours depending on the type of food) without risk of bacterial contamination. In addition, the device provides a measure of quality control by insuring "doneness," which is defined as achieving the required health code temperature and coloration.

In accordance with another aspect of the invention, a method is provided for storing previously cooked food, that is especially suited for a plurality of individual portion sandwich fillings, over extended periods of time without any significant detrimental effect on the quality of the food, including the appearance, taste and texture and without risk of bacterial contamination.

In one aspect, the food staging device in accordance with the invention includes a cabinet containing a plurality of discrete compartments, each bounded by an upper heated compartment surface and a lower heated compartment surface. The upper and lower compartment surfaces are constructed from a material having a high thermal conductivity, preferably from anodized aluminum. The previously cooked food portions are held within the compartments until the food portions are sold or otherwise disposed of. The air currents throughout the cabinet, if any, are limited because each of the compartments is segregated from other compartments and has solid upper and lower surfaces as well as closed sidewalls and limited access doors, the combination of which limits air flow in the compartments. In addition, air currents within the compartments are limited because both the lower and upper surfaces of the compartments are heated, thereby minimizing regions of thermal gradients within the compartments.

The device also includes at least one inlet door on one side of the device for inserting the food portions into the compartments and one complementary outlet door on the opposite side of the device for removing therethrough food portions contained in the compartments. This pass-through configuration of the doors promotes an efficient use of space in the kitchen containing the device because, for example, the device can be positioned intermediate the food cooking area and the cooked food assembly area, thereby providing cooking and assembly restaurant personnel separate access to the device. One inlet and corresponding outlet door may be provided to service one, two or more compartments.

In accordance with another aspect of the invention, the device may include a plurality of opposed corresponding inlet and outlet doors such that each of the compartments has its own inlet and outlet door. In addition, the inlet and outlet doors preferably are vertically spaced apart from each other by a distance approximately equal to the thickness of the doors to enable the doors to open by swinging in a generally upward direction, without any further structure enclosing the cabinet interior in the area between adjacent doors from the exterior. Thus, there is provided a relatively narrow, elongated slot opening permitting limited air flow between the compartment of the device and the atmosphere. Typically, the slot height should be no more than about 0.25 inches. Using a separate inlet and outlet door for each compartment further limits air transfer between the interior of the device and the atmosphere, thereby limiting vapor transfer from the cooked food articles contained therein and further protecting the appearance, taste, and texture of the food portions. The inlet and outlet doors preferably are attached to the cabinet by pins located at the upper opposed edges of the doors, enabling the doors to open by swinging in a generally upward direction. If desired, no stops are provided for holding the doors open. Consequently, the doors automatically close by their own weight, thereby further minimizing air transfer and promoting a relatively constant temperature within the compartments. Alternatively, a stop may be provided for each door as desired to hold it in an open position.

In another aspect, the food staging device in accordance with the invention includes a cabinet containing a plurality of discrete compartments, each bounded by an upper heated compartment surface and a lower heated compartment surface. However, no inlet or outlet doors are provided to the compartments, leaving open, unobstructed inlet and outlet areas. The upper and lower compartment surfaces are constructed from a material having a high thermal conductivity, preferably from anodized aluminum. Air currents throughout the cabinet, if any, are limited because each of the compartments is segregated from other compartments and has solid upper and lower surfaces as well as closed sidewalls and the trays configured for use in the compartments are sized to allow a minimum and controlled air gap between the top of the tray and the upper surface of the compartment. One inlet area is provided on one side of the device for inserting the food portions into the compartments and one complementary outlet area is provided on the opposite side of the device for removing therethrough food portions contained in the compartments. Generally, one inlet area and a corresponding outlet area are provided for access to each compartment. The unobstructed inlet and outlet areas provide cooking and assembly restaurant personnel quick access to the device for inserting and removing cooked food. Using a separate inlet and outlet area for each compartment limits air transfer between the interior of the device and the atmosphere, thereby limiting vapor transfer from the cooked food articles contained therein and further protecting the appearance, taste, and texture of the food portions.

In accordance with another aspect of the invention, the device includes a plurality of trays for containing the food portions. One type of tray includes a sidewall having an upper edge and a lower edge, a closed bottom attached to the lower edge, and an open top defined by the upper edge. The trays have a height such that the top edges of the trays are a predetermined vertical distance, generally in the range of from 0 to 0.090 inches and most preferably about 0.060 inches, from the upper heated compartment surface when the trays are inserted into the compartments, thereby creating a controlled, almost sealed section between the tray and the compartment. The preferred gap for biscuits and hotcakes is about 0.125 inches. A typical tray height is in the range from about 2 inches to about 2.5 inches. By limiting the space between the top edges of the trays and the upper compartment surface, and plate surface temperature, evaporation of liquid from the cooked food portions is minimized, thereby maintaining the appearance, taste, and texture of the cooked food held in the device over extended storage periods such as up to about two hours. In addition, the trays can be configured such that the length of the trays is less than but approximately equal to the depth of the compartments thereby enabling easy removal of the trays through the outlet area of the compartment.

Typical storage temperatures are in the range of from about 145–210° F. and preferably about 155° F. for biscuits, hamburger patties, grilled chicken, eggs, Canadian bacon, pork sausage, hotcakes and muffins, about 200° F. for breaded chicken nuggets, breaded chicken fillets and breaded fish fillets. Trays with solid bottoms and raised sides are preferred for unbreaded meat and other food products such as hamburger patties, grilled chicken, eggs, Canadian bacon, pork sausage, biscuits, muffins and hotcakes. Flat trays with a mesh or wire grid with medium sides are preferred for fried breaded products including breaded chicken nuggets, breaded chicken and fish fillets.

In accordance with yet another aspect of the invention, each of the compartments includes an upper electric resistance heating element for heating the upper compartment surface and a lower electric resistance heating element for heating the lower compartment surface. Additionally, temperature sensors are provided on the upper and lower compartment surfaces for monitoring the temperature of each surface. The temperatures generated by the heating elements therefore can be individually monitored and controlled by appropriate control circuitry. Consequently, the compartment temperatures can be separately controlled thus providing different holding temperatures in different compartments. As a result, the device can be used to simultaneously hold previously cooked food items at two or more temperatures, therefore eliminating the need for separate staging devices and further promoting an efficient use of space within the kitchen containing the staging device.

In accordance with another aspect of the invention, a method of storing previously cooked food products is provided. In accordance with this method, the previously cooked food products (such as individual portion sandwich fillings) are stored in a device that is composed of at least one compartment for holding the food portions, with the compartment bounded by upper and lower heated compartment surfaces. A cabinet defines an enclosed volume for housing the compartment therein, the cabinet including at least one area for inserting and removing the food portions from the compartment, where the compartment has a predetermined compartment height and width. The method includes placing the previously cooked sandwich fillings in at least one tray having a solid bottom and upwardly extending tray walls resulting in a tray height that is about 0 to 0.090 inches less than the compartment height. Thereafter, the tray containing the cooked sandwich fillings is placed in the heated compartment with the heated compartment surfaces having a temperature in the range of from about 145° F. to less than the boiling point of water. A gap is achieved between the top of the tray and the upper heated compartment surface between about 0 and 0.090 inches for restricting and controlling water vapor evaporating from the sandwich fillings contained in the tray. Thereafter, the inlet door is closed, if there is one, and the sandwich fillings in the tray are stored for a desired period of time.

Preferably, in accordance with the foregoing method, the cooked sandwich fillings stored in the tray fill at least about 5% and most preferably at least 50% of the tray volume.

BRIEF DESCRIPTION OF THE DRAWINGS

FIG. 4 is a partially cut-away front elevational view of a second cooked-food staging device according to the invention;

FIG. 5 is a partially cut-away side elevational view of the device in FIG. 4;

FIG. 8 is a partial perspective view of a portion of the food staging device of FIG. 1;

FIG. 9 is a perspective view of a tray for use in the device of FIG. 1;

FIG. 10 is a perspective view of an alternative tray used in the device;

FIG. 11 is a perspective view of a wire grid support used in the device;

FIG. 12 is a sectional view of the wire grid support of FIG. 11 taken along line 12—12 of FIG. 11 and having schematic food portions depicted thereon;

FIG. 16 is a perspective view of a third cooked food staging device according to the invention;

FIG. 17 is a front elevational view of the device in FIG. 16;

FIG. 19 is a perspective view of a compartment of the device in FIG. 16;

FIG. 20 is a sectional view taken along line 20—20 in FIG. 19; and

FIG. 21 is a sectional view taken along line 21—21 in FIG. 19.

DETAILED DESCRIPTION

Figure 1:
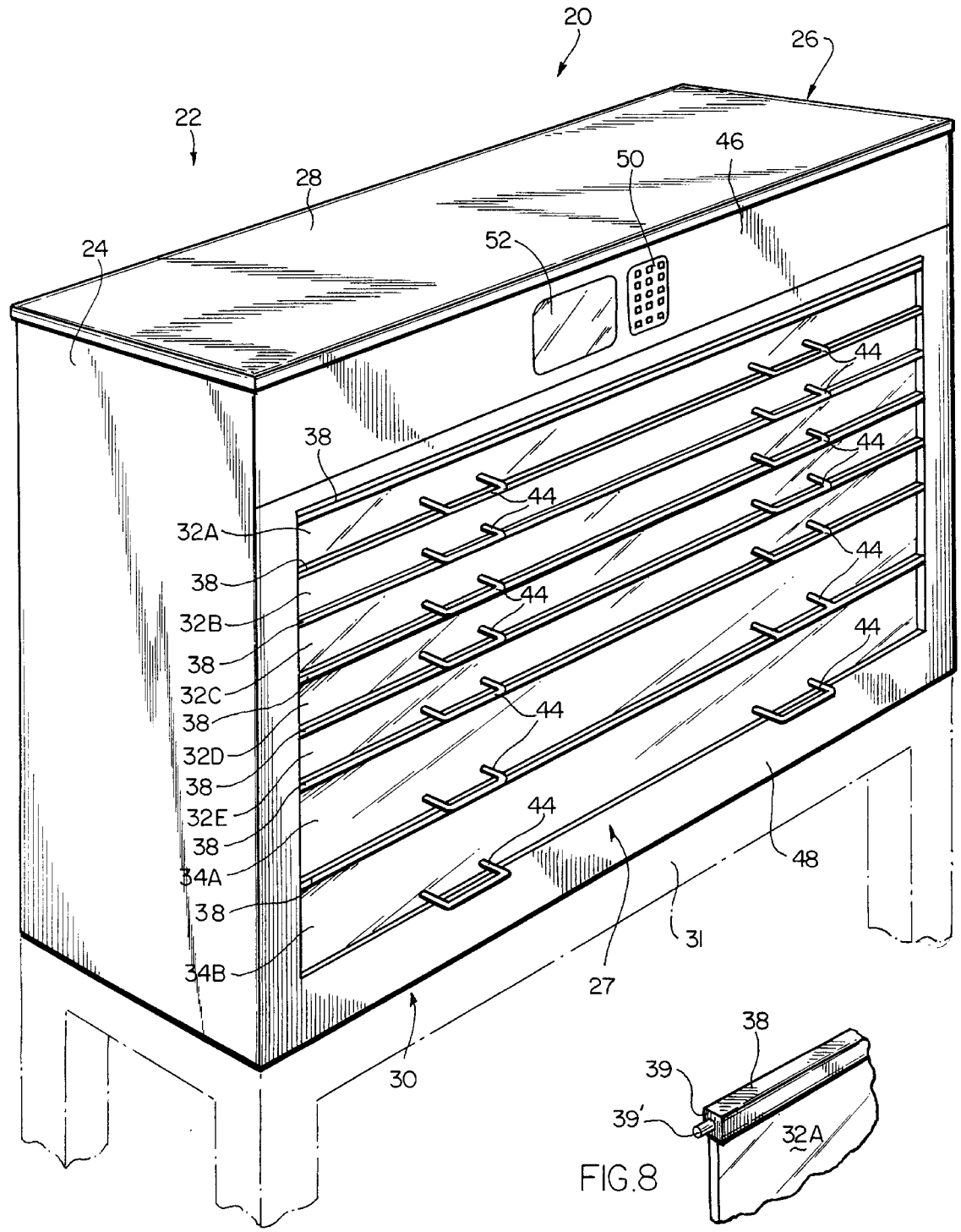
FIG. 1 is a perspective view of a cooked food staging device according to the invention.
Figure 2:
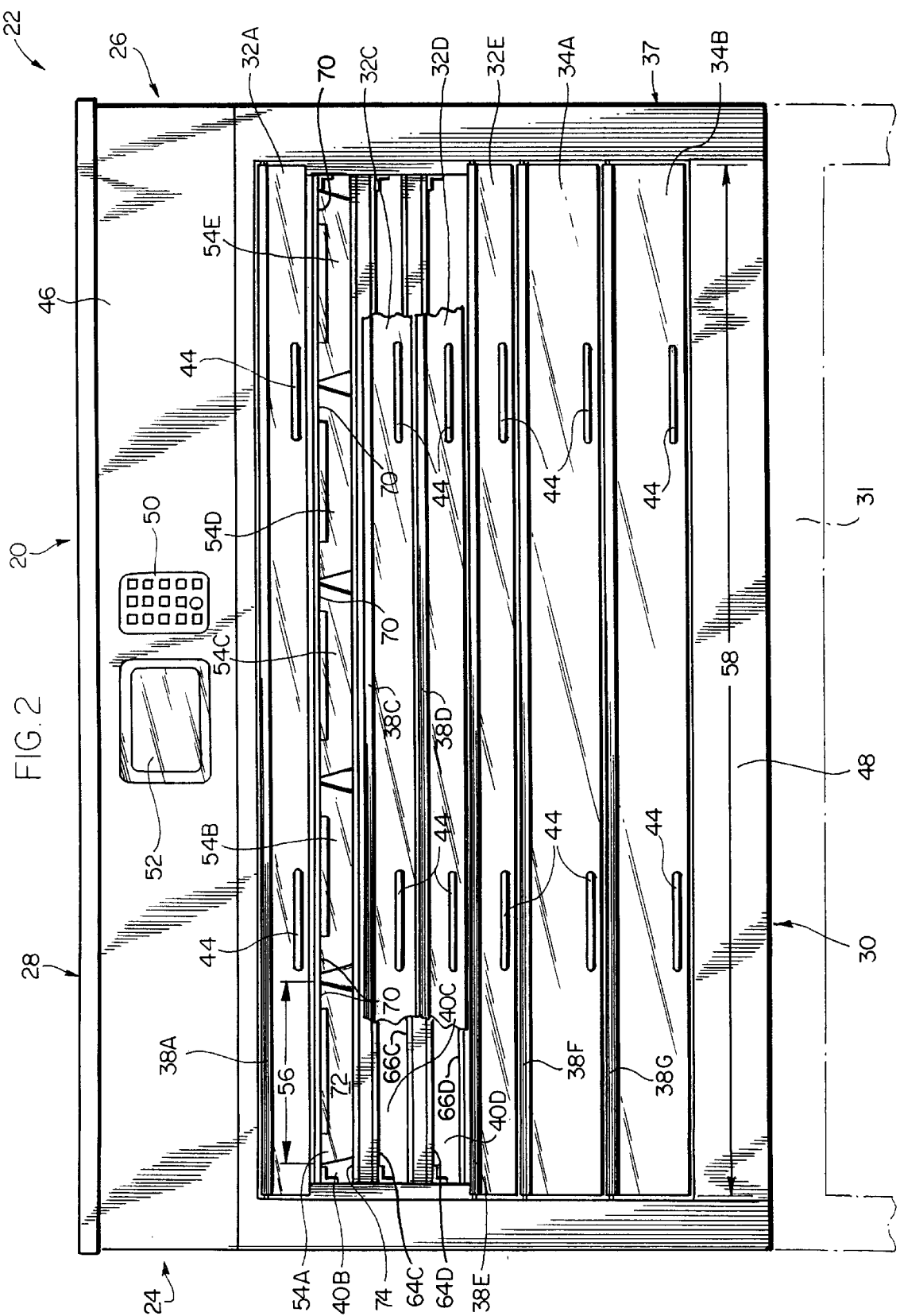
FIG. 2 is a front elevational view of the device in FIG. 1.
Figure 3:
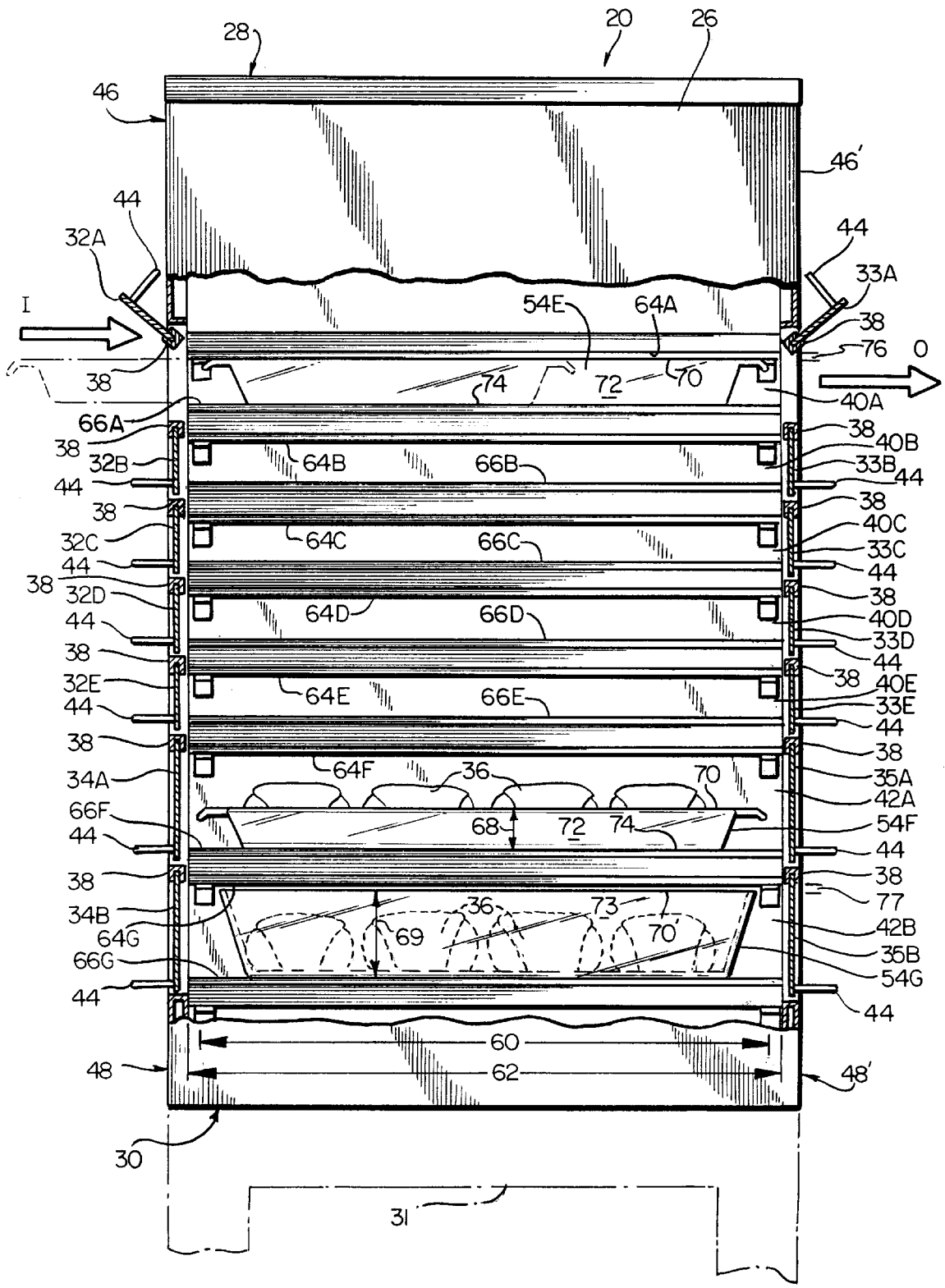
FIG. 3 is a partially cut-away side elevational view of the device in FIG. 1 showing the placement of food-containing trays within the device.

Referring to the Figures generally, where like reference numerals refer to like structure, and in particular to FIGS. 1–3, there is illustrated a cooked food staging device 20 according to the invention. Device 20 includes a cabinet 22 having two sidewalls 24 and 26, a closed top 28, and a closed bottom 30. As shown in FIG. 1, device 20 may be supported by a separate support structure 31. Alternatively, device 20 may rest directly on the floor (not shown) where codes permit or on a table (not shown) via bottom 30. Front 27 of device 20 also includes vertically spaced apart inlet doors 32A–E and 34A–B, located on inlet side I of device 20, as illustrated in FIG. 3. Inlet doors 32A–E swing open upwardly and generally are all the same width and height. Inlet doors 34A–B, however, are larger than inlet doors 32A–E to provide access to larger holding compartments for larger cooked food items, such as biscuits 36, as shown in FIG. 3. Alternatively, all inlet doors can have the same dimensions. As shown in FIG. 3, device 20 also includes outlet doors 33A–E, located opposite inlet doors 32A–E, and outlet doors 35A–B, located opposite inlet doors 34A–B. For each inlet door 32A–E or 34A–B there is a corresponding outlet door 33A–E or 35A–B located on outlet side O of device 20 as illustrated in FIG. 3. Each of inlet doors 32A–E and 34A–B, as well as outlet doors 33A–E and 35A–B, are hinged to cabinet 22 along their upper edges and can include a reinforcing member 38 (shown in FIGS. 1–3 and 8) attached to their upper edges. Reinforcing members 38 generally are U-shaped channels extending along the length of each door 32–35, with the top portion of each door 32–35 being disposed in a force-fit relationship in the channel portion of its respective reinforcing member 38. Each of reinforcing members 38 has ends 39 that are closed as illustrated in FIGS. 2 and 8 and each has a pin 39' mounted thereto and extending parallel to the length of member 38. Each pin 39' is disposed in a corresponding aperture (not shown) in cabinet 22, to provide the hinging mechanism for doors 32–35.

Raising doors 32A–E, 33A–E, 34A–B and 35A–B provides access into the discrete, heated compartments 40A–E and 42A–B, respectively, contained within cabinet 22, as best seen in FIG. 3.

Doors 32A–E, 33A–E, 34A–B and 35A–B include handles 44 to facilitate opening doors 32A–E, 33A–E, 34A–B and 35A–B to gain access to compartments 40A–E and 42A–B. Doors 32A–E, 33A–E, 34A–B and 35A–B do not include any stop members which would retain them in an open position. Each of doors 32A–E, 33A–E, 34A–B and 35A–B thus moves to a closed position under its own weight when its respective handles 44 are released, thereby preventing sustained heat losses from compartments 40A–E and 42A–B. Each door is spaced apart from its adjacent door(s) by a predetermined distance approximately equal to and slightly greater than the thickness of the lower of the two doors. For example, as seen in FIG. 2, door 34B is spaced apart from adjacent door 34A by a distance 37 which is approximately equal to the thickness of door 34B. In a preferred embodiment, the door thickness is about 0.25 inches and distance 37 is slightly greater than about 0.25 inches. Cabinet 22 can also include a fixed upper front panel 46 located above top inlet door 32A and a fixed lower front panel 48 located below bottom inlet door 34B, as seen in FIGS. 1 and 2. Similar panels 46' and 48' are provided for the outlet side O of device 20. A control keyboard 50 and a display 52 located along panel 46 are operatively connected to the control circuitry of device 20 and enable programming and monitoring of the temperatures and times within each of the heated compartments 40A–E and 42A–B.

Preferably, control keyboard 50 controls a microprocessor controller (not shown) that is programmed in a known manner to provide the desired temperature control, time control and display information. Preferably, each of compartments 40A–E and 42A–B is programmable to a desired set point temperature within the specified temperature range for upper and lower heated surfaces 64 and 66, depending on product type.

If desired, a separate display can be provided for breakfast, lunch and dinner types of food. The display can be divided into a series of rows and columns, each row corresponding to one of compartments 40A–E and 42A–B. Each column corresponds to a horizontal tray position. For example, as shown in FIG. 2, there are five horizontal tray positions (trays 54A–E) and seven compartments resulting in a display having seven rows and five columns. Each column and row can be set to display the row and column number, the name of product stored in that position in device 20 and the countdown hold time remaining for that particular product. Preferably, the row and column display with the lowest time remaining for that product will be highlighted on the display so that the operator can select that tray first.

When a product type is selected for a particular row and column, the desired temperature set points are implemented for the corresponding upper and lower heated surfaces 64 and 66. The microprocessor controller checks the other columns (positions) in that row (shelf) for compatible temperatures considering food products already in storage on that shelf, and if not compatible, an audible beep can be generated, the input not accepted and "incompatible product selection" or other warning as desired displayed on display 52. For example, chicken nuggets (200° F. storage temperature) should not be stored on the same shelf with hamburger patties (170° F. storage temperature.)

FIG. 2 shows device 20 with inlet door 32B raised to provide access to trays 54A–E within compartment 40B. For ease of handling by a person, trays 54A–G preferably are constructed from a material having a low heat capacity, such as polycarbonate. Preferably, each of trays 54A–E, as well as trays 54F–G shown in FIG. 3, has a width 56 smaller than the width 58 of compartments 40A–E and 42A–B to permit placing more than one tray within a compartment. FIGS. 9 and 10 depict trays 54G and 54A, respectively. In the preferred embodiment shown in FIG. 2, width 56 is chosen relative to width 58 such that five trays 54A–E will fit within any of compartments 40A–E and 42A–B. In addition, each of the trays has a length almost equal to the depth 62 of compartments 40A–E and 42A–B, as seen in FIG. 3. For example, tray 54F is of length 60.

Each of compartments 40A–E and 42A–B is bounded by an upper heated compartment surface 64A–G and a lower heated compartment surface 66A–G, as shown in FIG. 3. Each of lower heated compartment surfaces 66A–G is flat and substantially horizontal to provide uniform heat transfer to trays 54A–G and permit easy sliding of those trays along the surface of lower heated compartment surfaces 66A–G. Each of trays 54A–F has a height 68 defined by the distance between the upper edge 70 of the sidewall 72 and the lower edge 74 of sidewall 72 of trays 54A–F. Height 68 is chosen so that upper edge 70 of any of trays 54A–F is at a predetermined distance 76 from upper compartment surfaces 64A–F when trays 54A–F are placed within compartments 40A–E so that vapor transfer out of the interior of the trays is minimized, thereby also minimizing the fluid loss of the cooked food portions stored therein which is important for cooked food stored in trays 54 such as egg products, hamburger patties, grilled chicken, pork sausage and Canadian bacon. Preferably for such food, the cooked food portions fill more than about 5% and more preferably about 17–50% or more of the volume of trays 54 when stored in device 20. Generally, minimal vapor transfer is achieved out of the interior of the trays when distance 76 is in the range of 0–0.090 inches. Most preferably, height 68 is chosen so that the distance 76 is approximately 0.060 inches (0.125 inches for biscuits). In the embodiment shown in FIGS. 1–3, compartments 42A–B are of greater height than compartments 40A–E to accommodate larger food portions such as biscuits 36. Consequently, when trays 54A–F are placed within compartments 42A–B, upper edges 70 are at a substantial distance greater than distance 76 from upper heated compartment surfaces 64F–G. Sidewall 73 of tray 54G has an increased height 69 so that a gap 77 is provided between the upper edge 70' of tray 54G and upper heated compartment surface 64G. Gap 77 is about 0.060 inches (0.125 inches for biscuits).

For cooked, breaded food such as breaded chicken nuggets, breaded fish and chicken fillets, achieving minimal vapor transfer is usually not desirable because such food may have a tendency to become soggy. Sogginess is usually objectionable for cooked, breaded food products. Consequently, a larger gap than distance 76 should be employed such as at least 1.0 inch, for example. Alternatively, cooked, breaded food products may be stored within one or more of compartments 40A–E or 42A–B on a wire grid support or on a tray having a wire grid support therein. FIGS. 11–12 illustrate a wire grid support 79 that is suitable for supporting cooked, breaded food products within compartments 40A–E and 42A–B.

Wire grid support 79 comprises a tray 81 made of ultem or a similar material that houses a removable frame 87. Frame 87 is connected to a grid having wires 83 and perpendicular wires 85 as shown in FIGS. 11 and 12. Cooked, breaded food products P are placed on wire grid support 79 in order to provide air circulation beneath breaded food products P so that they do not become soggy. Wires 83 and 85 have a diameter of about 0.06 inches, thereby providing a spacing from the surface of tray 81 of about 0.250 inches. It is advantageous to minimize the distance from the heated surface yet still provide an air space from the heated lower compartment surfaces 66A–G.

Returning now to FIG. 3, upper heated compartment surfaces 64A–G and lower heated compartment surfaces 66A–G are constructed from a material having a high thermal conductivity and preferably are constructed from anodized aluminum.

The previously cooked food portions are held within compartments 40A–E and 42A–B, preferably within trays 54A–G, until sold or otherwise disposed of. Because compartments 40A–E and 42A–B are discrete, with well-defined upper heated compartment surfaces 64A–G and well-defined lower heated compartment surfaces 66A–G, air currents throughout cabinet 22, if any, are limited because surfaces 64A–G and 66A–G obstruct air flow within cabinet 22. In addition, air currents within compartments 40A–E and 42A–B, if any, are limited because both upper heated compartment surfaces 64A–G and lower heated compartment surfaces 66A–G are heated thereby reducing or eliminating thermal incongruities within compartments 40A–E and 42A–B. By restricting the air currents throughout cabinet 22 and within compartments 40A–E and 42A–B, device 20 reduces the amount of moisture lost from the food portions held therein and thus protects the appearance, taste, and texture of the food portions. Evaporation of liquid from the food portions is further minimized by choosing height 68 of trays 54A–F such that upper edges 70 of trays 54A–F are at a small, predetermined distance 76, generally preferably greater than 0 and less than about 0.090 inches and most preferably 0.060 inches, from upper compartment surfaces 64A–E when trays 54A–F are placed within compartments 40A–E for minimizing vapor loss from the food contained therein. For increasing the amount of vapor loss, gap 77 can be increased.

Device 20 also promotes an efficient use of space within a kitchen containing device 20. A kitchen in a quick service restaurant is frequently divided into two or more work areas. For example, the food cooking area can include food cooking devices such as grills, deep fat fryers, and other cooking devices, for example, for cooking sandwich fillings such as hamburger patties, fish fillets, chicken fillets, eggs and chicken nuggets. After being cooked, the food portions are transported to the sandwich assembly area for sandwich assembly which can include applying condiments to the cooked food portions, placing the cooked food portion in a roll or bun, and/or wrapping the cooked food portions. Consequently, restaurant personnel in the food cooking area and in the sandwich assembly area handle the cooked food portions. Device 20 promotes an efficient use of space when device 20 is located within the kitchen intermediate the food cooking area and the sandwich assembly area. When so positioned, the restaurant personnel responsible for cooking can place a tray 54E containing the cooked food portions within compartment 40A through inlet door 32A of device 20 of inlet side I, as shown in FIG. 3. Then, when the cooked food portions are needed for assembly into a sandwich, restaurant personnel remove tray 54E from compartment 40A through outlet door 33A of outlet side O of device 20, as shown in FIG. 3. The flow-through configuration of inlet doors 32A–E and outlet doors 33A–E thus enables the cooking and assembly personnel to have completely separate access to cooked food portions held within device 20. Of course, the cooked food portions may be removed through inlet door 32A of inlet side I.

FIGS. 4 and 5 illustrate a second embodiment of a cooked-food staging device 80 according to the invention. Device 80 includes a cabinet 82 having two sidewalls 84, 86, a closed top 88, a closed bottom 90, an upper front panel 92, a lower front panel 94, and a right front panel 96. Keyboards 114 and displays 116 are provided in right front panel 96 to program and monitor the temperatures within the holding chambers 100A–F contained within cabinet 82. Holding chambers 100A–F are bounded by upper heated chamber surfaces 102 and lower heated chamber surfaces 104. Chambers 100A–F are also bounded by inlet doors 108A–F and outlet doors 112A–F hingedly attached along their upper surfaces to cabinet 82 in a manner as described previously with respect to device 20. Doors 108A–F and 112A–F are lifted by grasping handles 118 to thereby gain access to chambers 100A–F. In FIG. 4, inlet doors 108A and 108B are raised to reveal trays 120 contained within chambers 100A and 100B. The width 122 of trays 120 is such that three trays 120 will fit within any of chambers 100A–F. The length 124 of trays 120 is almost equal to the depth of chambers 100A–F so that trays 120 may be readily handled through inlet doors 108A–F and through outlet doors 112A–F, as best seen in FIG. 5. Cabinet 82 can also include a compartment 98 for holding non-heated food portions. Compartment 98 is bounded by an inlet door 106 and an outlet door 110, both of which provide access to compartment 98. Doors 106 and 110 include handles 118 for rotating doors 106 and 110 along their upper hinged edges.

Figure 6:
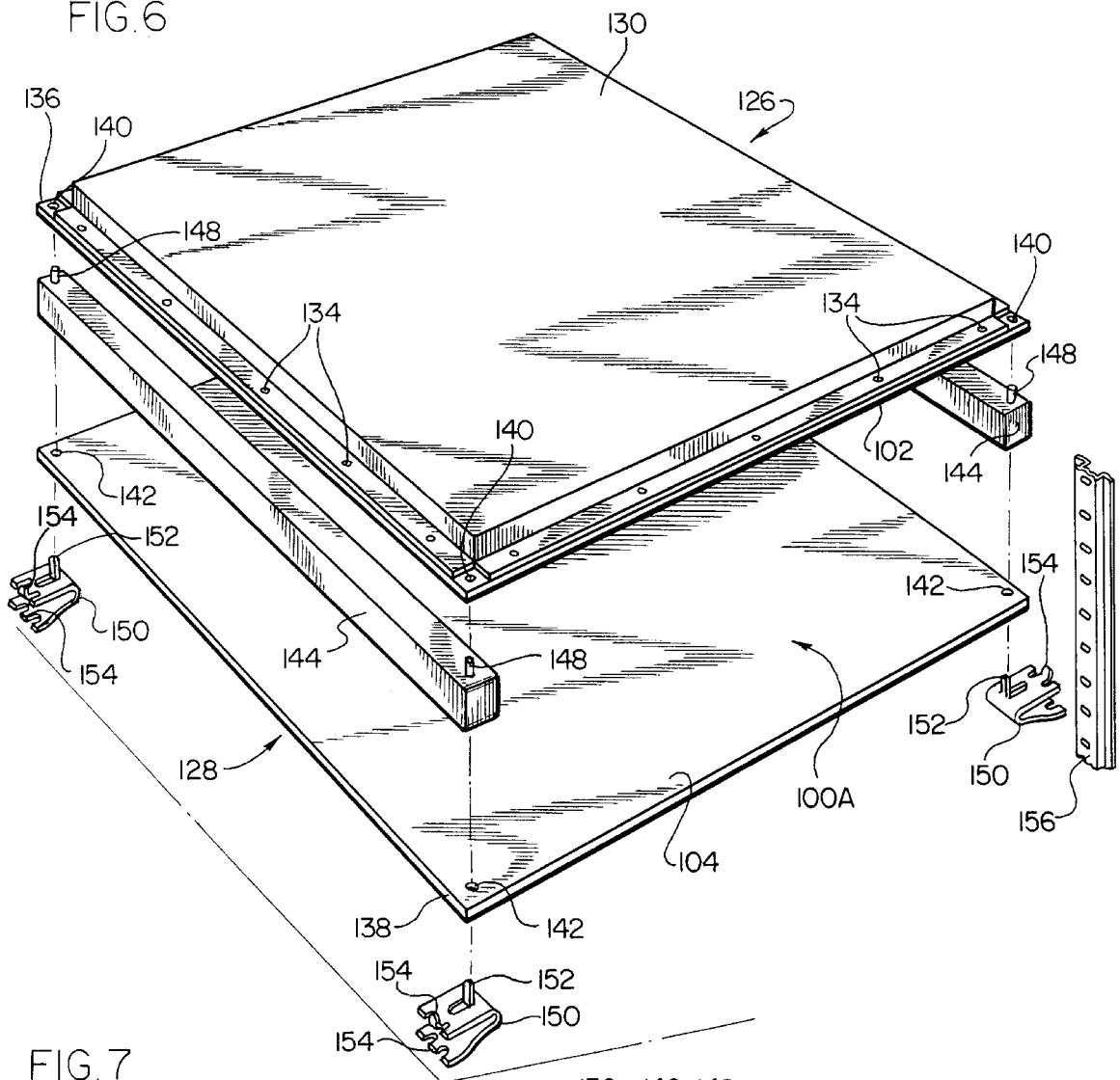
FIG. 6 is an exploded view of two of the heated shelves within the device in FIG. 4.
Figure 7:
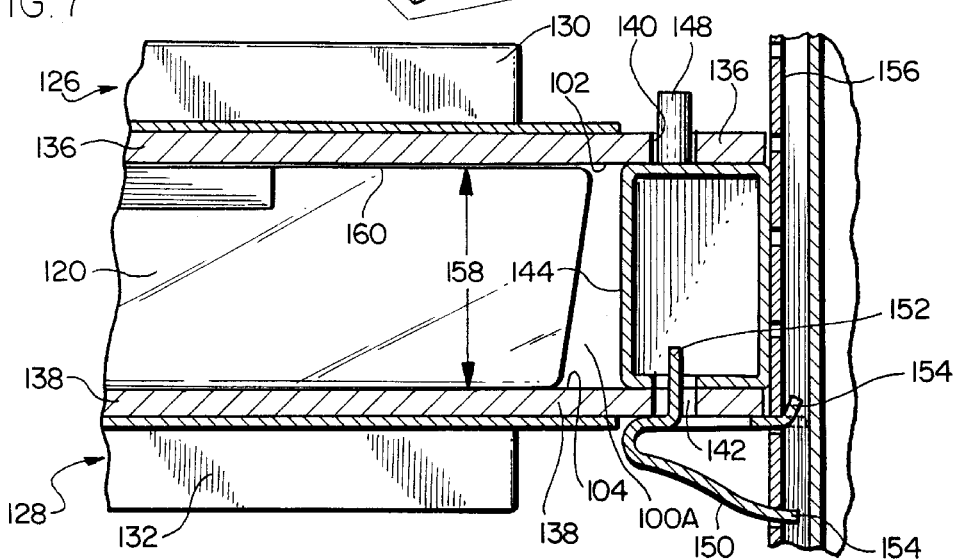
FIG. 7 is a sectional view taken along line 7—7 in FIG. 5 showing the attachment of the shelves to the cabinet of the device in FIG. 4.

FIGS. 6 and 7 illustrate one system for attaching upper heated chamber surfaces 102 and lower heated chamber surfaces 104 to cabinet 82. Surfaces 102 and 104 are parts of shelves 126 and 128 which contain heating components for heating surfaces 102 and 104. Preferably, the source of heat is an electric resistance heating element, the construction of which is well known in the art. In addition to surface 102, shelf 126 includes a hollow housing 130 overlying surface 102. The heating component is positioned within the space between housing 130 and surface 102. Similarly, shelf 128 includes surface 104, an underlying housing 132, and a heating component positioned inside housing 132. Surfaces 102 and 104 are attached to housings 130 and 132 by conventional methods, such as rivets 134. Surfaces 102 and 104 extend beyond housings 130 and 132 to form flanges 136 and 138 which contain holes 140 and 142 for attaching shelves 126 and 128 to cabinet 82. Surfaces 102 and 104 are separated by two spacers 144, each of which includes posts 148 for engaging the holes of the overlying flange, for example, holes 140 of flange 136. Clips 150 underlying shelf 128 include posts 152 for engaging holes 142 of flange 138. Clips 150 also include prongs 154 for engaging shelf brackets 156 attached to sidewalls 84 and 86.

As best seen in FIG. 7, shelf 128, including lower heated chamber surface 104, is attached to clip 150 by inserting post 152 through hole 142 of flange 138. Clip 150 in turn is attached to bracket 156 via prongs 154. Spacer 144 is then positioned over shelf 128 and clip 150 so that post 152 is inserted into an opening in the bottom of spacer 144. Finally, shelf 126 is aligned with and mounted on spacer 144 so that post 148 extends through hole 140 in flange 136. The height 158 of trays 120 is chosen so that the top edges 160 of trays 120 are at a predetermined distance from upper heated chamber surfaces 102, as previously described with respect to device 20, when trays 120 are placed within chambers 100A–F. However, since the height of chambers 100A–F is determined by the height of spacers 144, different chamber dimensions can be achieved by using differently sized spacers. Consequently, device 80 can be readily configured to provide holding chambers which can accommodate trays having various heights.

Figure 13:
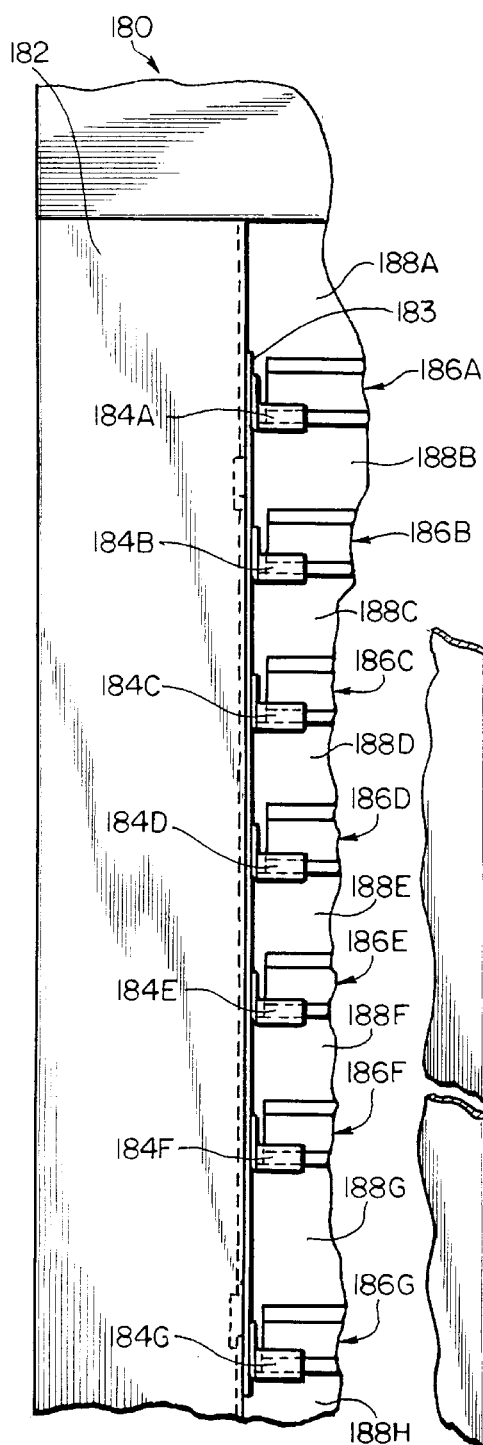
FIG. 13 is a partial elevational view of the interior of a cooked food staging device according to the invention and showing an alternative means for securing shelves within the device.
Figure 15:
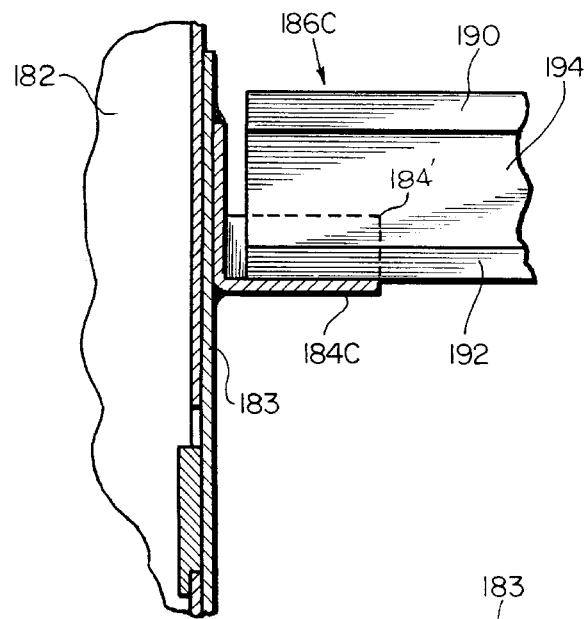
FIG. 15 is a sectional view of a portion of the interior of the device in FIG. 13 taken along line 15—15 of FIG. 14 and showing a shelf therein.
Figure 14:
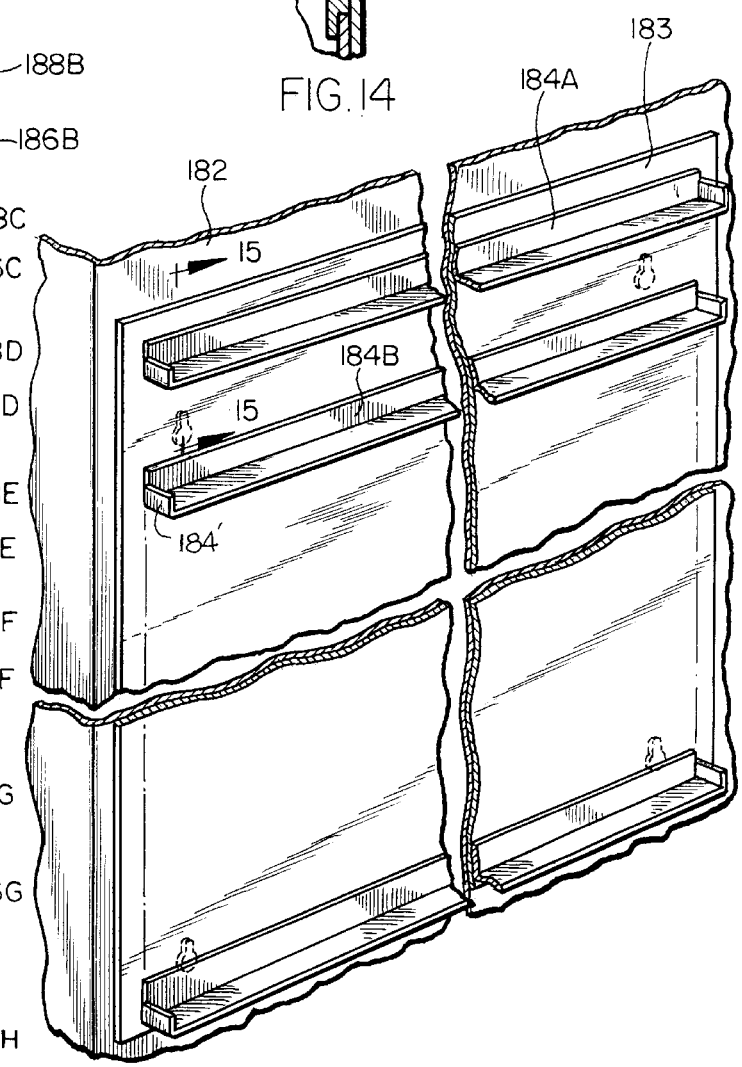
FIG. 14 is a perspective view of the interior of the device in FIG. 13.

An alternative preferred embodiment device is depicted in FIGS. 13–15 as staging device 180. Staging device 180 has an exterior sidewall 182 and an interior sidewall 183 attached thereto, as most clearly seen in FIG. 14 by any suitable structure, such as by a weld or fastener, for example. Angle irons 184A–G are mounted to interior side wall 183 to support shelves 186A–G. Each end of angle irons 184A–G uses an upturned tab 184' for preventing lateral movement of shelves 186A–G when mounted thereon. Shelves 186A–G define heated compartments 188A–H.

FIG. 15 is an enlarged view of shelf 186C, which is representative of the other shelves. Shelf 186C includes an upper heated surface 190, a lower heated surface 192 and a housing 194 for storing the heating components (not shown).

In use, device 80 can be positioned within the kitchen of a quick service restaurant in an area intermediate the food cooking area and the food finishing area. The flow-through design of inlet doors 106 and 108A–F and outlet doors 110 and 112A–F thus promotes an efficient use of space within the kitchen. Device 80 also protects the appearance, taste, and texture of cooked food portions held therein because the discrete upper and lower heated chamber surfaces 102 and 104 limit air currents within device 80, thereby reducing or eliminating moisture losses from the food portions. In addition, electrical resistive heating elements can be used as the heating components for heating surfaces 102 and 104. Such heating elements can be individually controlled by the control circuitry of device 80. As a result, device 80 can be used to simultaneously hold previously cooked food portions at two or more temperatures, therefore eliminating the need for separate staging devices and further promoting an efficient use of space within the kitchen containing device 80. Generally, the heated chamber surfaces will be maintained in the temperature range from about 145° F. to less than the boiling point of water during the period of time that the sandwich fillings are stored in the chambers.

Figure 18:
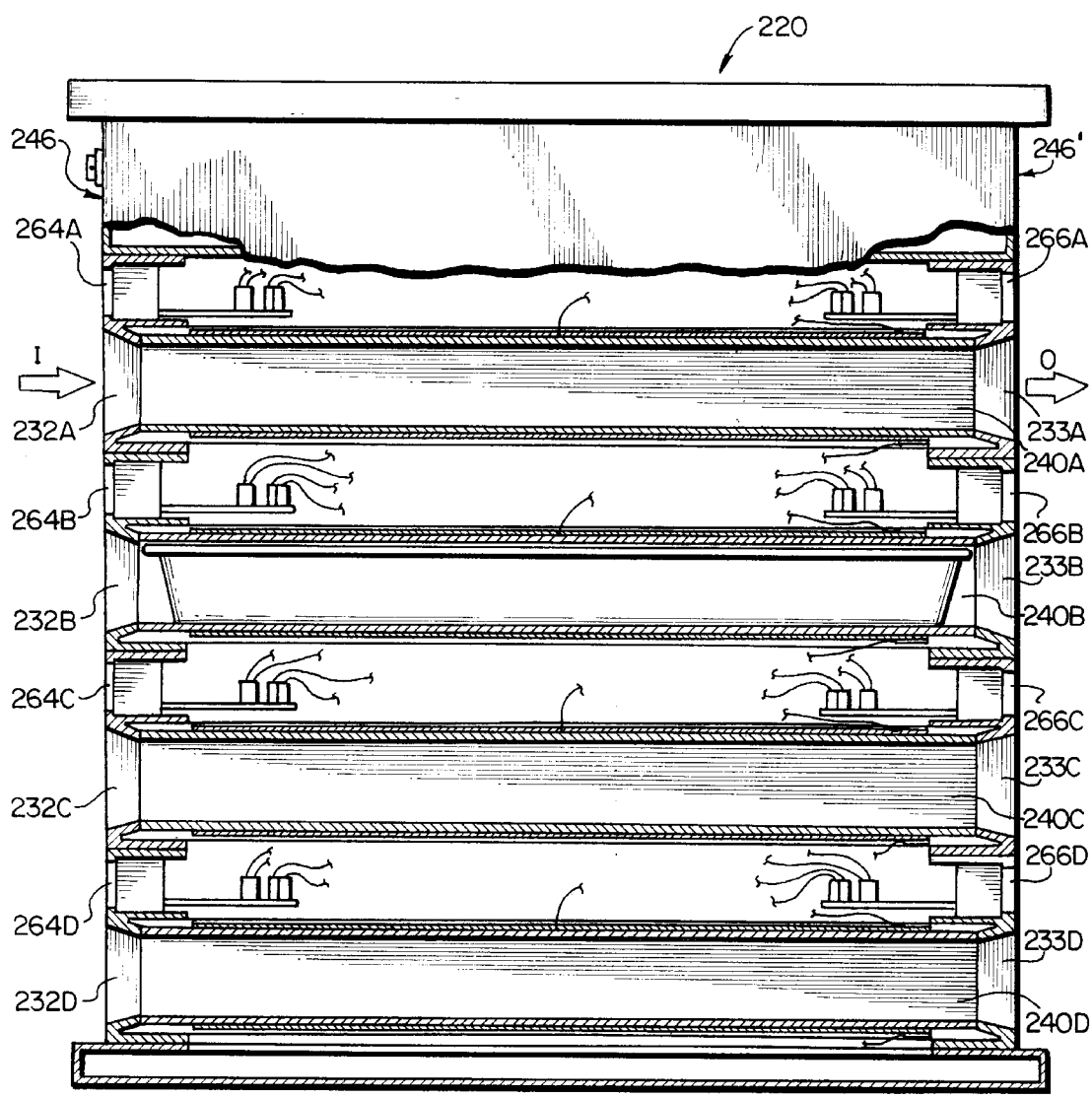
FIG. 18 is a partial sectional view of the device taken along line 18—18 in FIG. 17.

In FIGS. 16–18 there is illustrated a third preferred embodiment of a cooked food staging device 220 according to the invention. Device 220 includes a cabinet 222 having two sidewalls 224 and 226, a closed top 228, and a closed bottom 230. Sidewalls 224, 226 have air vents 260, 261 near closed bottom 230. Front 227 of device 220 also includes vertically spaced apart inlet areas 232A–D, located on inlet side I of device 220, as illustrated in FIG. 18. Inlet areas 232A–D generally are all the same width and height. However, larger or smaller inlet areas or inlet areas of different heights and widths may be provided to access holding compartments for larger or smaller cooked food items. As shown in FIG. 18, device 220 also includes outlet areas 233A–D, located opposite inlet areas 232A–D. For each inlet area 232A–D there is a corresponding outlet area 233A–D located on outlet side O of device 220. Inlet areas 232A–D and outlet areas 233A–D provide access into the discrete, heated compartments 240A–D contained within cabinet 222.

Cabinet 222 can also include a fixed upper front panel 246 located above top inlet area 232A and a fixed upper front panel 246' located above upper outlet area 233A, as seen in FIGS. 16–18. In the area of cabinet 222 behind upper front panels 246, 246', electronics and other equipment for cooked food staging device 220 may be housed. Preferably, power equipment, electronics for monitoring and controlling the temperature of the holding compartments, electronics for controlling the displays and a fan for circulating air through cabinet 222 via the side panel vents 260, 261 are housed behind fixed upper panels 246, 246'.

Above each inlet area 232A–D and each outlet area 233A–D, are control and display areas 264A–D and 266A–D, respectively. As shown in FIG. 17, the width of compartment 240B is sized to hold three trays 263 representing three column positions in the compartment. Preferably, three displays are provided in control and display area 264A–D and 266A–D representing the three tray positions. The displays are programmed to alternatively display the type of food product held in the tray position and the time remaining for holding the cooked food item in the tray position. The control buttons are used to select a product type for a tray position and reset the time remaining. Preferably selecting the product type will automatically select the temperature and appropriate holding time. Most preferably, the control circuitry prevents cooked food items requiring different temperature settings from being placed in the same compartment by visually and/or audibly alerting personnel to this situation. Notably, control and display areas 264A–D are replicated on outlet side O as control and display areas 266A–D and are controllable from either inlet side I or outlet side O for the convenience of the restaurant personnel.

The heated compartments housed in cabinet 222 are preferably of a modular construction. FIG. 19 shows a perspective view of compartment 240A of device 220. Compartment 240A is representative of compartments 240B–D. Compartment 240A is bounded by an upper heated compartment surface 270, a lower heated compartment surface 272 and spacers 274, 276. The upper heated compartment surface 270 and the lower heated compartment surface 272 are preferably made of black anodized aluminum. Bezzles or face plates 278, 280 are provided at the inlet side and outlet side of the compartment. The face plates 278, 280 form a portion of the front and back surfaces, respectively, of cabinet 222. The face plates 278, 280 have openings coinciding with the inlet and outlet areas of the compartment and the control and display areas. The face plates 278, 280 are preferably injection molded. An electric resistance heating element 284 is adhesively attached to the top surface of upper heated compartment surface 270 and a similar heating element 286 is provided on the bottom surface of lower heated compartment surface 272. A temperature sensor 287, such as a thermal couple or thermistor, is preferably centrally located under heating element 284 to sense the temperature for the control circuitry. A similar temperature sensor (not shown) is provided under heating element 286.

A preferred heating element is composed of a wire or other electrical resistance element confined between and insulated by two layers of silicon rubber material. The layers of silicon rubber material are bonded together and bonded to heated compartment surfaces 270, 272 by heating. The preferred heating element is approximately $\frac{1}{16}$" thick and is available from Heatron of Leavenworth, Kans.

As discussed previously, an important aspect of the present invention is maintaining a minimal gap between the tray and the upper heating element of the compartment holding the tray. The heights of trays 263 are chosen so that the top edges of trays 263 are at a predetermined distance from the upper heated surface. The lengths of trays 263 are almost equal to the depth of compartments 240A–D. As shown in FIG. 20, spacers 274, 276 preferably have extruded slots 290, 292 which receive the upper heated compartment surface 270 and lower heated compartment surface 272, respectively. The slots 290, 292 are preferably extruded to maintain a precise height separating upper heated surface 270 from lower heated surface 272. Thus, a tray may be sized to maintain the preferred minimum gap of 0.060 inches between the top edge of the tray and the upper heated surface.

An alternative to the embodiments of the cooked food staging device is to provide the cabinet with a closed back, eliminating the outlet side O and removing all associated access, displays and controls. Alternatively, the discrete heated compartments may be provided with a back or otherwise closed at the outlet side O. This alternative embodiment is particularly useful where the cooked food staging device is not placed in a location intermediate the food cooking area and the food assembly area. For example, in a quick service restaurant where there is very limited space, the alternative closed back embodiment may be used, allowing restaurant personnel access only from the inlet side.

Described herein is a device and method for storing cooked food portions at elevated temperatures. With the present invention, food may be stored for a limited period of time without any significant adverse impact on quality or safety. The invention promotes efficient food handling and use of space within the kitchen of a quick service restaurant. However, the invention need not be limited to use in a quick service restaurant. The invention is useful in cafeterias, commissary kitchens, and the like for all types of products such as chicken breast, prime rib, lasagna and vegetables.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A device for holding a plurality of previously cooked food portions at elevated temperatures, comprising:

a plurality of compartments for holding the food portions, each of said plurality of compartments having a compartment height and being bounded by an upper heated compartment surface and a lower heated compartment surface;

a cabinet defining a volume that encloses said plurality of compartments therein, said cabinet including one inlet area for inserting the food portions into said compartment and an outlet area opposite said inlet area for removing the food portions contained in said plurality of compartments, said inlet and outlet areas located on opposed sides of said cabinet; and at least one tray for containing the previously cooked food portions, said tray including a tray bottom and a tray sidewall, said tray sidewall extending upwardly from said tray bottom and terminating at an upper edge, wherein said tray has a height that is zero to about 0.25 inches less than the height of at least one of said plurality of compartments such that when said tray is stored in said at least one of said plurality of compartments, evaporation of liquid from the cooked food portions contained within said tray is restricted.

2. The device in claim 1 wherein the height of said tray is approximately 0.060 inches less than the height of at least one of said plurality of compartments.

3. The device of claim 2 wherein the height of each of said plurality of compartments is about 2.5 inches.

4. The device in claim 1 wherein said at least one tray has a length that is less than and substantially equal to a depth of said plurality of compartments.

5. The device of claim 1 wherein said lower heated compartment surface is heated by a respective lower electric resistance heating element and said upper heated compartment surface is heated by a respective upper electric resistance heating element.

6. The device of claim 1 wherein said upper and lower heated compartment surfaces are substantially planar and horizontal.

7. A device for holding a plurality of previously cooked food portions at elevated temperatures, comprising:
- a cabinet having a cabinet front, a cabinet rear, spaced-apart first and second opposed sidewalls, a top and a bottom;
- an uppermost shelf and a lowermost shelf, said uppermost shelf comprising a lower heated surface and said lowermost shelf comprising an upper heated surface;
- means for heating said upper and lower heated surfaces;
- at least one interior shelf located above said lowermost shelf and below said uppermost shelf and comprising an upper surface, a lower surface vertically spaced apart from the upper surface, and heating means for heating said upper surface and said lower surface of said interior shelf, said heating means being located in the space between said upper surface and said lower surface of said interior shelf;
- an upper holding chamber and a lower holding chamber for containing cooked food portions, said upper holding chamber being bounded and heated by a lower heated chamber surface defined by the upper surface of the interior shelf and an upper heated chamber surface defined by the lower heated surface of the uppermost shelf, said lower holding chamber being bounded and heated by a lower heated chamber surface defined by said upper heated surface of the lowermost shelf, and an upper heated chamber surface defined by said lower surface of said interior shelf;
- upper and lower inlet areas located in said cabinet front for inserting the food portions into said upper and lower holding chambers, respectively; and
- upper and lower outlet areas opposite said upper and lower inlet areas, respectively, and located in said cabinet rear, for removing the cooked food portions from said upper and lower holding chambers, respectively; and
- an upper tray for containing the previously cooked food portions, said upper tray comprising a bottom and a sidewall extending upwardly from said bottom, said sidewall defining an upper tray height that is in the range of from about 0 inches to about 0.25 inches less than the height of said upper holding chamber; and
- a lower tray for containing the previously cooked food portions, said lower tray comprising a bottom and a sidewall extending upwardly from said bottom, said sidewall defining a lower tray height that is in the range of from about 0 inches to about 0.25 inches less than the height of said lower holding chamber.

8. The device of claim 7 wherein said upper holding chamber has a first height and said lower holding chamber has a second height and said first height is different from said second height.

9. The device of claim 8 wherein said upper tray height is approximately 0.060 inches less than the first height of said upper holding chamber and said lower tray height is approximately 0.060 inches less than the second height of said lower holding chamber.

10. The device of claim 8 wherein the length of said upper and lower trays is less than and substantially equal to a depth of said upper and lower holding chambers, respectively.

11. The device of claim 7 wherein said means for heating said interior shelf and said means for heating said uppermost and lowermost shelves each comprises at least one electric resistance heating element.

12. A method of storing previously cooked food portions in a device having at least one heated compartment for holding the food portions bounded by upper and lower heated compartment surfaces, and a cabinet defining an enclosed volume for containing the compartment therein, the cabinet including at least one area for inserting and removing the food portions into the compartment, the compartment having a compartment height and a compartment width, comprising the steps of:
- placing the previously cooked food portions in a tray having a tray height that is about 0 to 0.090 inches less than the compartment height;
- placing the tray containing the cooked food portions in the heated compartment, the heated compartment surfaces having a temperature in the range of from about 145° F. to less than the boiling point of water and achieving a gap between about 0 and 0.090 inches between the top of the tray and the upper heated compartment surface for restricting water vapor evaporating from the food portions contained in the tray; and
- storing the food portions in the tray in the compartment for a desired period of time.

13. The method of claim 12 wherein the step of placing the food portions in a tray comprises placing sufficient food portions in the tray to fill at least 5% of the volume of the tray.

14. The method of claim 12 wherein the step of placing the food portions in a tray comprises placing sufficient food portions in the tray to fill at least 50% of the volume of the tray.

15. The method of claim 12 further comprising the step of maintaining the heated compartment surfaces in the temperature range of from about 145° F. to less than the boiling point of water during the period of time that the food portions are stored in the compartment.

* * * * *